United States Patent [19]

Karr

[11] 4,200,525

[45] Apr. 29, 1980

[54] LIQUID EXTRACTION PROCESS AND APPARATUS FOR ACCOMPLISHING THE SAME

[75] Inventor: Andrew E. Karr, Bloomfield, N.J.

[73] Assignee: Chem-Pro Equipment Corp., Fairfield, N.J.

[21] Appl. No.: 892,891

[22] Filed: Apr. 3, 1978

[51] Int. Cl.² ............................................. B01D 11/00
[52] U.S. Cl. ........................................ 210/21; 422/257
[58] Field of Search .................................. 210/21, 511; 23/270.5 T, 306; 422/257

[56] References Cited

U.S. PATENT DOCUMENTS

| 2,726,145 | 12/1955 | Thomas et al. | 23/270.5 T |
| 3,488,037 | 1/1970 | Prochazka et al. | 23/270.5 T |

FOREIGN PATENT DOCUMENTS 1066543  10/1959  Fed. Rep. of Germany ............. 210/23

OTHER PUBLICATIONS

Performance of a 36" Diameter Reciprocating Plate Extraction Column by Karr and Lo A.I.CH.E. meeting, Atlantic City, N.J. 8/1976.
Performance of a Reciprocating-Plate Extraction Column by Karr. Reprint from A.I.Ch.E. Journal, vol. 5, No. 4, Dec. 1959, pp. 446-452.
Chem-Pro's Bulletin KC 10, Karr Reciprocating Plate Extraction Column, Not dated, Admitted prior art.
Development of a Laboratory-Scale Reciprocating column by Lo and Karr, Ind. Eng. Chem. Process Des. and Development, vol. 11, No. 4, 5/1972.
Performance and Scale Up of a Reciprocating Plate Extraction Column by Karr and Lo, ISEC vol. 1, 1971.
McMasters University List of Papers on 2 inch Karr Columns 1971-1976.

Primary Examiner—John Adee

[57] ABSTRACT

A liquid extraction process using counterflowing liquid phases in a reciprocating plate extraction column in which the plates of the column are spaced with respect to one another approximately according to the equation:

$$l \alpha \frac{(U_D + 0.67\, U_C)^{2.5}}{(\Delta\rho)^{5/3}\, \sigma^{1.5}}$$

wherein l is the plate spacing, $U_D$ is the superficial velocity of the dispersed phase at flooding, $U_C$ is the superficial velocity of the continuous phase at flooding, $\Delta\rho$ is the density difference and $\sigma$ is the interfacial tension.

By using the above equation the volume of column required to carry out a specific extraction is minimized.

The extraction column comprises a casing, a reciprocating shaft in the casing having perforated plates and, optionally, baffle plates mounted thereon in a spatial relationship with respect to each other calculated on the basis of the equation and includes motive means and suitable cam and driving means to reciprocate the shaft.

4 Claims, 13 Drawing Figures

BAFFLE SPACING FOR 1" & 2" PLATE SPACING

U.S. Patent Apr. 29, 1980 Sheet 1 of 4 4,200,525
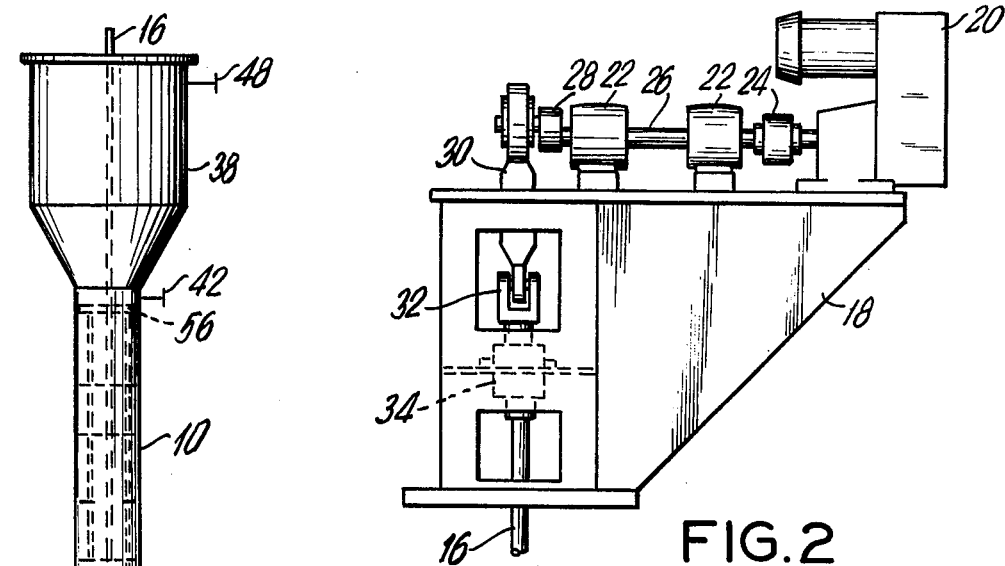
FIG. 2
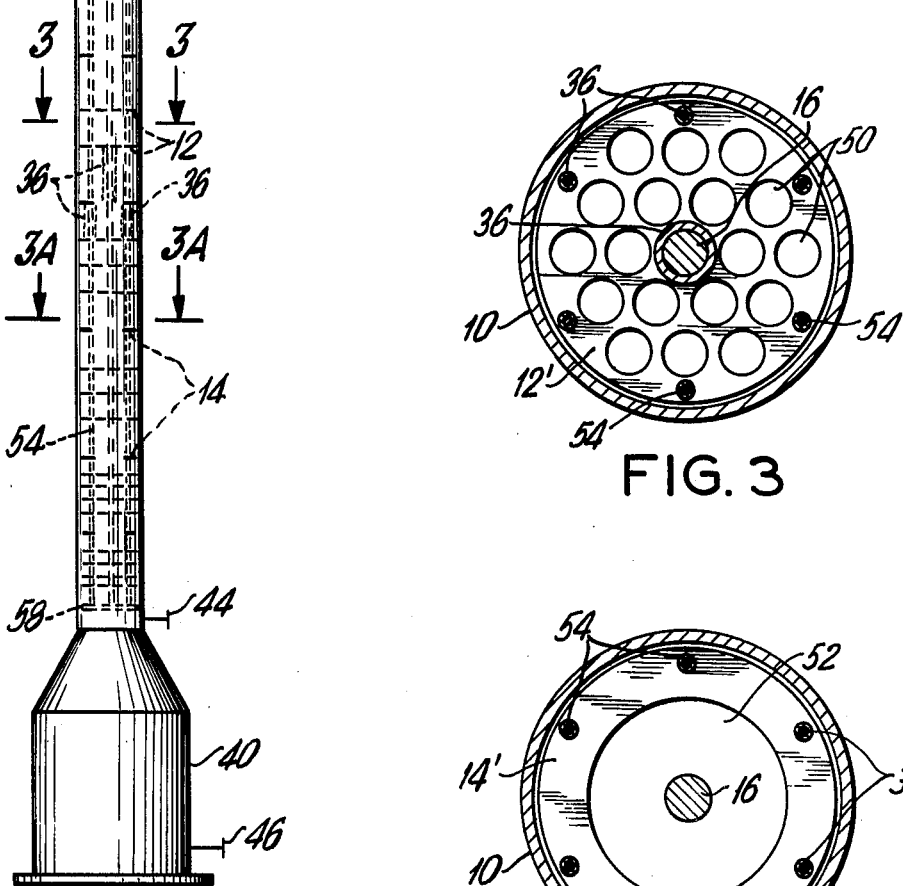
FIG. 3
FIG. 1
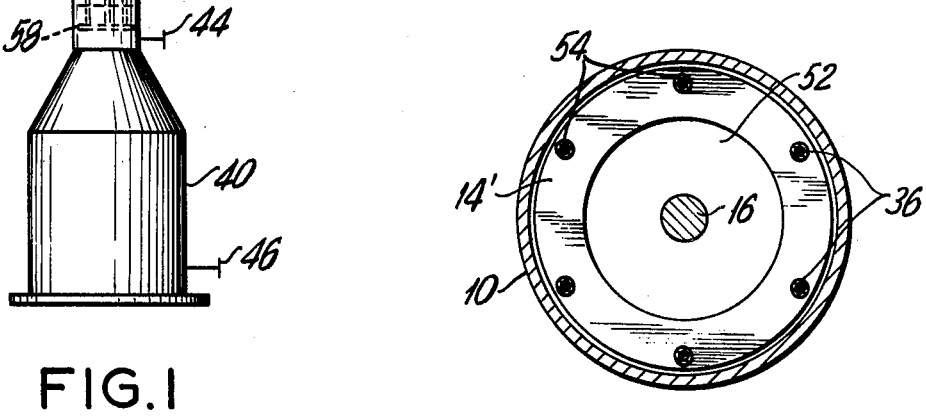
FIG. 3A

BAFFLE SPACING FOR 2" PLATE SPACING

BAFFLE SPACING FOR 1" PLATE SPACING

BAFFLE SPACING FOR 3" PLATE SPACING

BAFFLE SPACING FOR 4" PLATE SPACING

BAFFLE SPACING FOR 1" & 2" PLATE SPACING

LIQUID EXTRACTION PROCESS AND APPARATUS FOR ACCOMPLISHING THE SAME

This invention relates to a process for liquid extraction and an apparatus for accomplishing the same. More particularly, the invention relates to a process for liquid extraction in which counterflowing liquid phases are brought into contact with each other in a reciprocating plate extraction column and in which column the plates are spaced with respect to each other on the basis of a calculation made by use of a specific equation.

BACKGROUND OF THE INVENTION

Liquid extraction processes and apparatus have long been known wherein stationary packings or trays are utilized to aid in the separation of the components of liquid phases being passed through the apparatus in either co-current flow or in countercurrent flow. Such processes and the apparatus for carrying out the same are, however, generally very inefficient. This is so since there simply is not enough energy, even in counterflowing liquid phase processes, to create efficient mass transfer. Consequently, as a general rule, extraction columns for carrying out such processes must be relatively large in terms of size in order to provide a height equivalent to a theoretical stage, known as HETS, which will result in reasonably efficient extraction columns of this type and HETS of 6 to 20 feet or more are quite common.

In order to overcome the disadvantages of such processes and extraction columns utilized to accomplish the same, early attempts were made to add energy to the extraction columns used by disposing in the columns a series of mixers on long vertical shafts both with and without interspersed zones of mesh material to permit coalescence of phases between mixers. While such columns are an improvement upon the earlier columns employing stationary packings or trays, they have drawbacks related to the development of very small droplets in the vicinity of the agitators or mixers. Another variation of this second generation of columns utilizes a series of mixer and settler chambers disposed side by side in a horizontal arrangement. However, even with the improvements attained by the second generation of columns, maximum efficiency still is not attained. However, the horizontal arrangement mentioned is expensive to construct and like other earlier models of extraction columns, requires a great deal of floor space.

Subsequent designs utilized continuous phase pulsation of liquids to be extracted through a stationary column. Columns so constructed, however, have achieved only limited commercial importance primarily due to the fact that it is difficult to keep agitation uniform throughout large columns and, furthermore, greater power requirements are necessary to move a large volume of liquids in such columns. Consequently, further developments resulted in columns which employ a series of perforated plates which can be reciprocated in a convenient manner. Even these columns, with uniform plate spacing, however, exhibit certain drawbacks with respect to HETS, other size and design factors and efficiency of operation with respect to volume of liquid phases being transported through such columns and liquid separation to be accomplished thereby. However, such perforated plate columns are generally more efficient than the precursor columns, such as those mentioned above, even though there still exists a need for further improvements in reciprocating plate columns to provide columns of this type which are smaller in size, as well as more efficient in overall operation. The present invention provides such an improved process and apparatus for accomplishing the same with respect to reciprocating plate extraction columns.

BRIEF STATEMENT OF THE INVENTION

In accordance with the present invention, a process for liquid extraction using counterflowing liquid phases in a reciprocating liquid extraction column comprises spacing in at least a portion of the column two or more plates relative to one another approximately according to the equation:

$$l \alpha \frac{(U_D + 0.67\ U_C)^{2.5}}{(\Delta \rho)^{5/3}\ \sigma^{1.5}}$$

wherein $l$ is the plate spacing, $U_D$ is the superficial velocity of the dispersed phase at flooding, $U_C$ is the superficial velocity of the continuous phase at flooding, $\Delta \rho$ is the density difference and $\sigma$ is the interfacial tension between the counterflowing phases. Consequently, in accordance with the invention, a reciprocating plate extraction column comprises a casing, a vertical shaft within the casing, reciprocating means cooperating with the vertical shaft and a plurality of perforated plates disposed horizontally on the shaft, the plates being spaced apart from each other by a distance calculated according to the above-mentioned equation.

THE DRAWINGS

To elucidate the present invention more fully, reference is made to the accompanying drawings which are to be taken together with the following description and wherein:

FIG. 1 is a view in elevation of an extraction column according to this invention with the housing partially stripped away;

FIG. 2 is a view in elevation showing driving means employed in a column according to the invention;

FIGS. 3 and 3A are plan views taken across lines 3—3 and 3A—3A of FIG. 1 and show a perforated plate and a baffle plate, respectively, used in a column of the invention;

Figure 7:
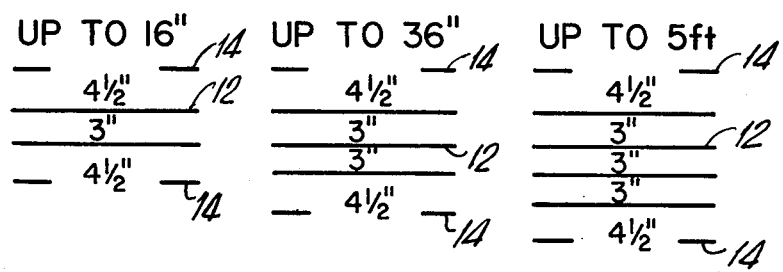
Figure 8:
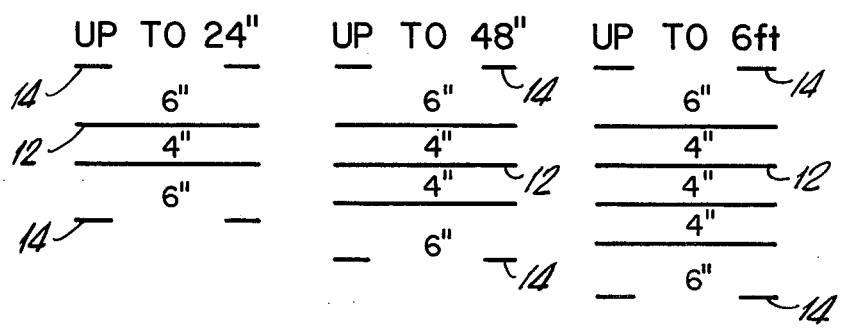
Figure 9:
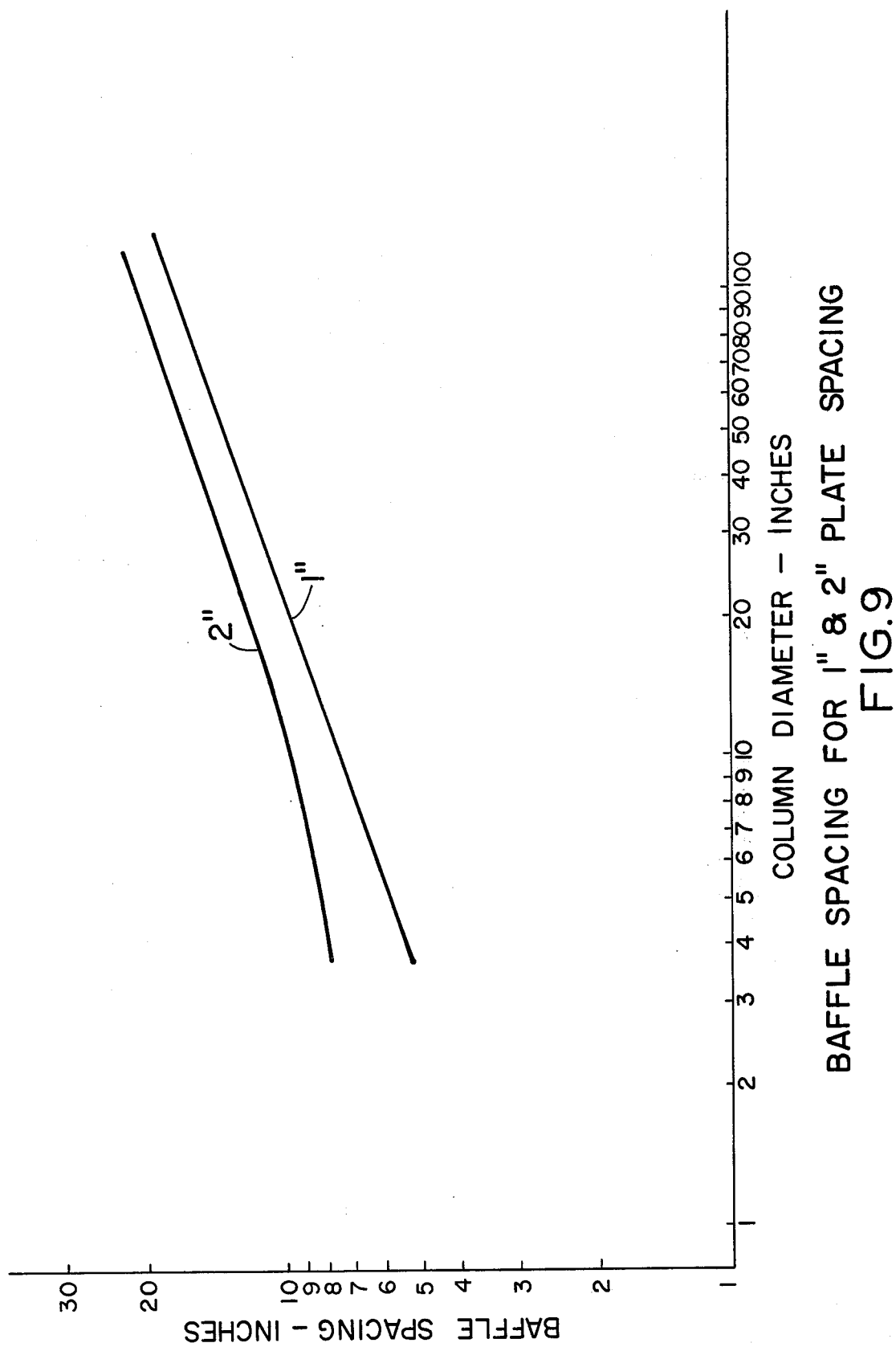

FIG. 6(a) through (d) is a diagramatic view showing various arrangements of perforated plates, baffle plates and discs in a column according to the invention;

FIG. 7 is a diagrammatic view showing the disposition of spacing of baffle plates and perforated plates in columns of various diameters according to the invention, the perforated plates being spaced 3 inches apart;

FIG. 8 is a diagrammatic view showing the disposition of spacing of baffle plates and perforated plates in columns of various diameters according to the invention, the perforated plates being spaced 4 inches apart; and FIG. 9 is a graph showing the relationship between extraction column diameters and baffle plate spacing for a separation column according to the invention and in which the perforated plates are spaced 1 and 2 inch distances from each other.

DESCRIPTION OF THE PREFERRED EMBODIMENTS

As mentioned above, reciprocating plate extraction columns are generally known in the art. However, the precise design with respect to spacing of the perforated plates, as well as baffle plates and/or discs employed therewith, has been approached on a trial and error basis with respect to varying plate spacing in a given column. Such an intuitive approach is tedious, time consuming and imprecise. For example, the trial and error approach requires visual observation of the dispersion of fluids or liquids being carried through the extraction column to determine drop size, hold-up and drop velocity from all of which a qualitative judgment is made with respect to whether the plate spacing should be increased or decreased in given portions of a reciprocating plate extraction column. However, these particular disadvantages are obviated by the present invention which makes it possible to predict the optimum plate spacing from the physical properties of each phase in the various sections of a given column, as well as from the flow rates of dispersed and continuous phases in the various sections of an extraction column by utilization of the equation set forth above.

It is known, as shown by the correlation in the published article by M. H. I. Baird, R. G. McGinnis, and G. C. Tann in the proceedings of the International Solvent Extraction Conference, Society of Chemical Industry, The Hague, in April 1971, that $$(U_D + 0.67\ U_C) = K_1 \left( \frac{\sigma^3}{\psi^2 \overline{\rho}} \right)^{0.2} \left( \frac{g^2 \Delta \rho^2}{\rho_C \mu_C} \right)^{\frac{1}{4}} \qquad (1)$$

where
$U_D$ = superficial velocity of the dispersed phase at flooding
$U_C$ = superficial velocity of the continous phase at flooding
$K_1$ = a constant the value of which is not material to this discussion
$\sigma$ = interfacial tension
$\Psi$ = energy dissipation per unit volume
$\overline{\rho}$ = average density
$\rho_C$ = density of continuous phase
$g$ = gravitational acceleration
$\Delta \rho$ = density difference
$\mu_C$ = viscosity of continuous phase
Now $\Psi$ is known to be proportional to $(Af)^3/l$ where
A = amplitude of stroke
f = frequency of reciprocation
l = plate spacing
Therefore, $$(U_D + 0.67\ U_C) \alpha \frac{\sigma^{0.6} l^{0.4}}{(Af)^{1.2} \overline{\rho}^{0.2}} (\Delta \rho)^{\frac{2}{3}} \left( \frac{g^2}{\rho_C \mu_C} \right)^{(\frac{1}{4})} \qquad (2)$$

It is to be noted that with respect to the mathematical relationships set forth, minor variables such as $\overline{\rho}^{0.2}$ and $$\left( \frac{1}{\rho_C \mu_C} \right)^{\frac{1}{4}}$$

can usually be neglected. Consequently, as the physical properties $\Delta \rho$, that is, the density difference, and $\sigma$, that is, the interfacial tension, and the superficial velocities vary in different parts of an extraction column, it is necessary for optimum operating results to insure that no one portion of the column be either undermixed, which results in poor extraction efficiencies, or overmixed, which results in premature flooding of the column. Since A and f are of necessity constant for all sections of the column, $$(U_D + 0.67\ U_C) \alpha l^{0.4} (\Delta \rho)^{\frac{2}{3}} \sigma^{0.6} \qquad (3)$$

Therefore, $$l \alpha \frac{(U_D + 0.67\ U_C)^{2.5}}{(\Delta \rho)^{5/3} \sigma^{1.5}} \qquad (4)$$

From equation (4) one can calculate an optimum relative plate spacing in various parts of a column so that no portion of the column is a severe bottleneck with respect to volume of throughput per unit of time because of excessive agitation and no portions of the column are operating at poor mass transfer efficiencies because of less than optimum agitation. The aforementioned bottleneck with respect to throughput and poor efficiencies in portions of the column occurs if the plate spacing is not optimized. Within the purview of equation (4) in accordance with the present invention, the extraction process can vary widely, being dependent upon the counterflowing liquid phases being passed through a given column, the rate of flow therethrough, and the particular optimized spacing of the reciprocating plates, as well as the rate of reciprocation and the amplitude of the reciprocal stroke.

Referring now more particularly to FIG. 1, a reciprocating plate column in accordance with the invention comprises a casing, shell or housing 10 which can be made of any suitable material such as metal, glass or other suitable material, dependent upon the particular liquid phases which are to be passed through the apparatus. In general, it is preferred to employ for the casing, shell or housing, as well as for any other parts of the apparatus used therewith, a material which will not be subjected to attack by the liquid phases being passed therethrough. As can be seen from FIG. 1 a column in accordance with the invention consists of a series of open type or perforated plates and baffle plates 12 and 14, respectively, and more particularly shown in detail in FIGS. 3 and 3A where they are generally designated by numerals 12' and 14', respectively, mounted on a central shaft 16 which is reciprocably driven by suitable means, such as a drive mechanism as shown in FIG. 2 including a drive structure 18, variable speed drive motor 20, pillow blocks 22, coupling 24, drive shaft 26, stroke adjuster 28, connecting rod 30, yoke 32, and guide bearing 34, the drive mechanism being connected to the central shaft 16, that is, the plate stack shaft of the column. The reciprocation mechanism of the drive means powered by motor 20 can be varied with respect to the amplitude of reciprocation between about 0 and 2 inches by adjustment of stroke adjuster 28. It is to be understood in this respect that the drive means and reciprocation mechanism can be constructed to vary the speed and amplitude of reciprocation as desired depending on the specific application, and the diameter of the column with which it is utilized. The series of perforated plates 12 and baffle plates 14 are spaced in accordance with the equation above, may vary widely in number per unit of height and may be distributed over a height in the column which will insure good performance. The column illustrated which may, for example, have an overall height of about 20 feet may have the series of plates disposed on a height of about 10 feet within the casing, shell or housing 10, the plates being held in spaced relationship a varying distance by spacers 36 of suitable size. Above and below the plates, phase disengaging spaces 38 and 40 are provided in the housing to minimize entrainment of liquids. Inlet feed spargers are suitably disposed in nozzles 42 and 44 for distributing the heavy and light liquids, respectively. The heavy and light liquids are discharged through nozzles 46 and 48, respectively.

Turning next to FIG. 3, as can be seen therein, a typical reciprocating perforated plate 12' is provided with punched-out areas or openings 50, the free area being generally approximately 50% of the total area of each plate and the openings being relatively large, that is, on the order of $\frac{1}{4}''$ to $\frac{3}{8}''$ holes. The diameter of the plate is slightly smaller than the internal diameter of the casing, shell or housing 10.

In contrast, as can be seen from FIG. 3A, a typical baffle plate 14' has a single large central punched-out area or opening 52, the diameter of the plate, however, being like that of the perforated plate, that is, slightly smaller than the internal diameter of the casing, shell or housing 10.

As can be seen in detail in FIGS. 3 and 3A, the plate stack shaft or central shaft 16 of the column passes through a central opening in a perforated plate 12' which is large enough to accommodate the shaft diameter while at the same time being loosely fitted to the shaft, the plate being separated from neighboring perforated plates by suitable spacers, such as designated by 36. In contrast, shaft 16 passes through the central axis of the relatively large opening 52 of a typical baffle plate 14'. The plate stacks are held in spaced relationship with respect to each other and with respect to shaft 16 by a plurality of tie rods 54 and suitable spacers 36, the tie rods passing through peripheral openings in the perforated plates and baffle plates. The tie rods suitably terminate in spider plates 56 and 58 which have relatively large central openings (not shown) similar to those of the baffle plates. The spider plates are fixed to the central shaft 16 in any convenient manner such as, for example, by means of a hub and radiating spokes or the like (not shown). The number of tie rods is not critical and may vary widely depending upon the column diameter. In columns of smaller diameter, that is, up to about 24 inches in diameter, generally approximately up to 6 tie rods are usually sufficient to confer the needed strength and rigidity to the plate stacks. It is to be understood, however, that the particular construction illustrated for maintaining the plate stacks in spaced relationship is not critical so long as the plates are spaced in accordance with equation (4) set forth above. Consequently, the plate stacks can be supported by any suitable convenient means other than tie rods and spider plates, if desired.

In accordance with the present inventiion, an extraction column may include not only the reciprocating perforated plates 12 mentioned above, but preferably includes baffle plates 14 also. Although the column may be operated without baffle plates, the presence of the same generally increases the extraction efficiency in columns greater than 3 inches in diameter.

Furthermore, in this regard, it is to be understood that as the diameter of a column is increased and the number of perforated plates spaced, for example, one inch apart remains constant, the extraction efficiency obtained by the process in such a column is substantially poorer than the extraction efficiency in a column of lesser diameter. This loss in efficiency is generally caused by the fact that greater axial mixing takes place in a column of large diameter as compared to a column of small diameter. On the other hand, with relatively large diameter columns, installation of the baffle plates improves the extraction efficiency substantially in comparison to a column of the same diameter wherein only perforated plates are utilized. Still even where baffle plates are utilized in a column of large diameter, extraction efficiency generally is not as great as in a column of smaller diameter.

Scale-up studies have shown that the height of an equivalent theoretical stage, HETS, varies with the diameter of the extraction column in accordance with the following mathematical relationships.

$HETS_{Min} \alpha D^{0.25}$ for an easy extraction system and $HETS_{Min} \alpha D^{0.38}$ for a difficult extraction system where $HETS_{Min}$ is the minimum value of HETS achieved and where D is the column diameter.

The above relationships reported in the literature apply to scale-ups based on tests in 3 inch diameter columns without baffle plates and 12 to 36 inch diameter columns with some baffle plates. In the 36 inch diameter column the baffle plates were 15 inches apart. The baffle plates in the large diameter column have been shown to reduce axial mixing and to reduce $HETS_{Min}$ compared to $HETS_{Min}$ obtained without the use of baffle plates. Baffle plates, as previously mentioned, are not necessary in small diameter columns.

It is to be understood, therefore, that additionally improved efficiency in large diameter columns is achievable by utilization of additional baffle plates in order to reduce axial mixing, thus resulting in better extraction efficiencies. Some of these improvements compared to those previously reported in the literature are shown in FIGS. 4, 5, 6, 7, 8 and 9.

In the practice of this invention, a wide variety of plate arrangements are effective as long as the plates are spaced in accordance with the above-mentioned equation (4). As can be seen from reference to FIGS. 4 and 5 exemplary suitable arrangements for one inch and two inch spacing of perforated plates as well as baffle plates are illustrated. Referring to those figures, as can be seen, the ratio of the number of baffle plates to perforated plates is greater for a column in which two inch plate spacing is utilized than for one inch plate spacing. For example, in FIG. 4 for a 12 inch diameter column with two inch plate spacing, one baffle plate for every three perforated plates is preferably utilized; whereas, in a column of the same diameter with one inch plate spacing, one baffle plate is employed for every six perforated plates, as shown in FIG. 5, the patterns being repeated to complete the total number of plates used in a column. Thus, a shown in FIG. 4 for a 12 inch diameter column with 2 inch plate spacing there may be utilized a baffle plate 14 followed by three perforated reciprocated plates 12 and a further baffle plate 14 followed by three perforated reciprocating plates (not shown) etc. until the total number of plates required for a particular column is provided.

Figures 6A, 6B, 6C, 6D:
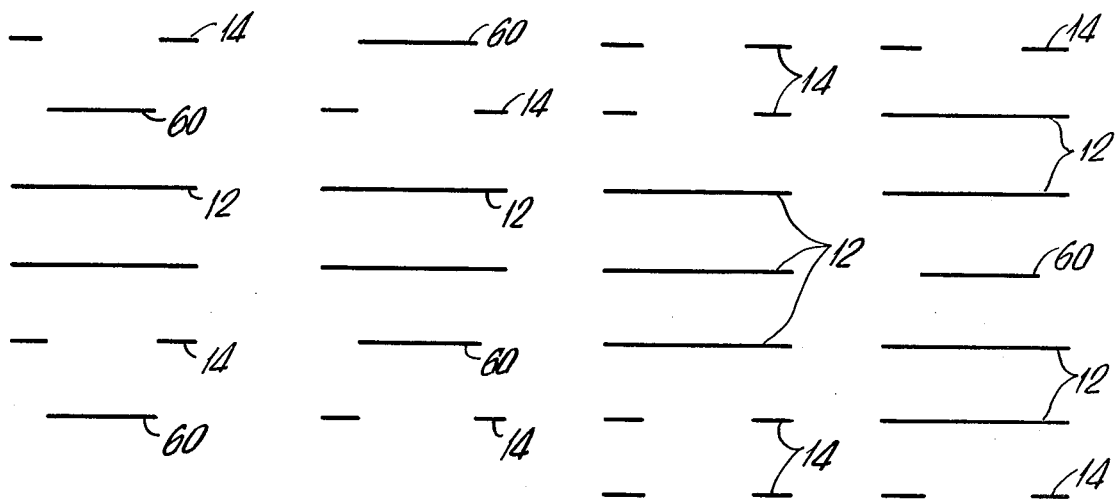

In accordance with the present invention various additional exemplary baffling schemes, such as for example, those shown in FIG. 6 result in even a further reduction in axial mixing. As can be seen from a the diagrammatic plate scheme of FIG. 6(a)–(d), there are varying illustrative, different arrangements of perforated plates, baffle plates and discs, such as disc 60 located under baffle plate 14, the disc having disposed thereafter two or more perforated plates 12, which can be employed in the present invention. The particular patterns of arrangements shown there are then repeated as often as necessary. In contrast to the arrangement shown in FIG. 6(a), there is illustrated in FIG. 6(b) an arrangement in which the positions of the baffle plate 14 and disc 60 are reversed. Consequently, respective use of the arrangements shown in FIGS. 6(a) and 6(b) can be used in carrying out the process of this invention dependent upon whether the light or heavy phase is the dispersed phase in a particular liquid-liquid extraction medium being utilized, the arrangement of FIG. 6(a) being preferred for a light dispersed phase in a given liquid-liquid extraction medium.

As a further illustration of a plate arrangement reference is made to FIG. 6(c) wherein two baffle plates 14 in series are utilized followed by two or more perforated plates 12. A still further arrangement is shown in FIG. 6(d) where the series of plates are arranged in the order of a baffle plate 14, followed by two perforated plates 12, disc 60, two additional perforated plates 12, and a final baffle plate 14, the pattern then being repeated as needed. Various other combinations of perforated plates, baffle plates and discs are possible within the broad concept of the process and apparatus of this invention.

It is to be noted that in the particular arrangements illustrated in the drawings and discussed above the distances between perforated plates and baffle plates and perforated plates and discs and baffle plates and baffle plates can be the same or greater than the distances between perforated plates.

In the varying plate arrangements all of the perforated plates and discs can be assembled in the form of a plate stack utilizing tie rods and spider plates or any other suitable means as mentioned hereinabove to support the plate stacks which are reciprocated in the column at the same amplitude and speed. Moreover, the arrangements of perforated plates and baffle plates as shown, for example, in FIGS. 4, 5, 6, 7 and 8 can be employed with the same repeating pattern in an extraction column where uniform plate spacing is preferred. On the other hand, in most cases plate spacing will not be uniform where optimum performance is to be achieved when physical properties and flow rates vary in different portions of the column. Consequently, the basic plate spacing may be varied in different portions of a given column and the relative distances between perforated plates per se and between peforated plates and baffle plates, as well as between baffle plates per se and baffle plates and discs may be arranged so that the spacing remains the same or can be different and varied in different parts of the column. However, the individual number of plates utilized will depend upon the plate spacing as illustrated, for example, in FIGS. 4 and 5.

Figure 4:
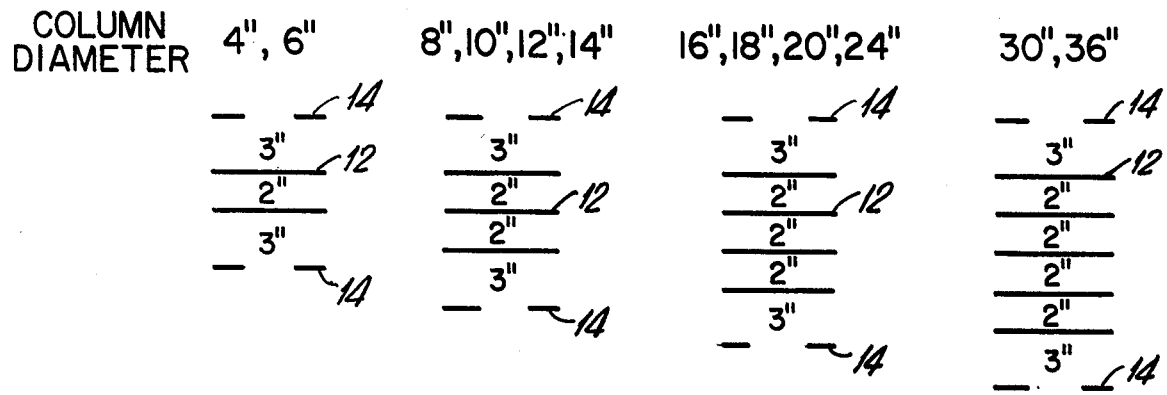
FIG. 4 is a digrammatic view showing the disposition of spacing of baffle plates and perforated plates in columns of various diameters according to the invention, the perforated plates being spaced 2 inches apart.
Figure 5:
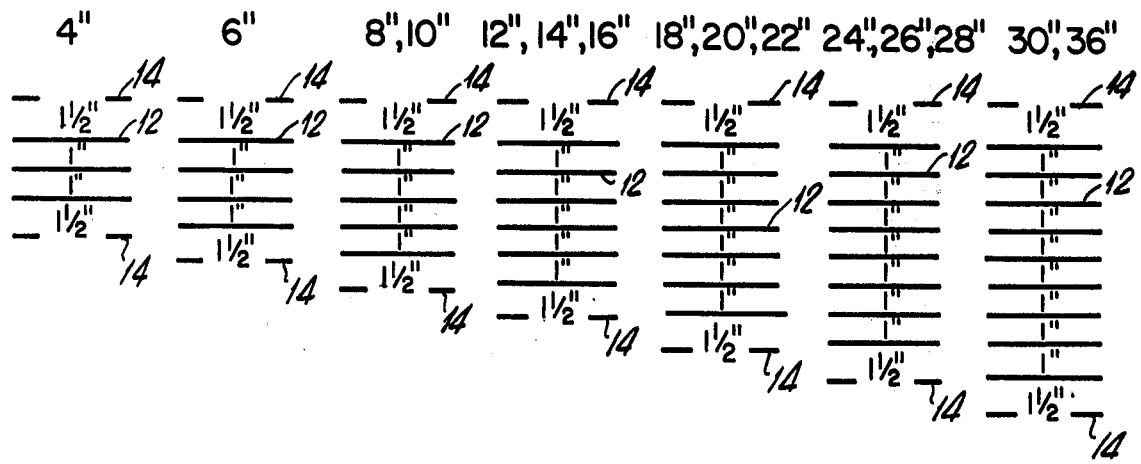
FIG. 5 is a diagrammatic view showing the disposition of spacing of baffle plates and perforated plates in columns of various diameters according to the invention, the perforated plates being spaced 1 inch apart.

Referring now to FIG. 9 of the drawings, there is shown a logarithmic scale graph which aids one employing the invention of this application in generally determining the spacing of the baffle plates for 1 and 2 inch perforated plate spacing as shown more particularly in FIGS. 4 and 5 in columns of varying diameters. For example, as can be seen from reference to FIG. 4, baffle plate spacing for 2 inch perforated plate spacing is approximately 8 inches in a 4 to 6 inch diameter column. While the illustrated graph is not absolutely precise, it can be employed as an aid for spacing baffle plates in any given system once the column diameter, which is dependent on throughput, is selected and the final relative spacing ratio of the perforated plates has been more particularly calculated by the use of equation (4). For plate spacings greater than 2 inches, similar design curves for selecting efficient baffle spacings can be drawn. It is to be understood that baffle plate spacings can also likewise be determined for the various other plate patterns discussed in detail hereinabove.

The term "plates" as employed herein and in the appended claims is to be understood to include perforated plates, baffle plates, discs and spider plates and the like as employed in a column in accordance with this invention.

With regard to equation (4), it is immaterial as to what standard units are used for the values therein so long as the same units are employed in different parts of a column. For example, if the interfacial tension is measured in units of dynes per centimeter at the top of the column, it should be measured in like units at the bottom since it is the ratio of such values which is important with respect to the inventive concept.

THE EXAMPLES

In order to illustrate the present invention more fully, the following examples are set forth. It is to be understood that these examples are illustrative only and not limitative.

Example 1

A reciprocating plate extraction column constructed in accordance with the apparatus description set forth hereinabove, containing only the described perforated plates and having a diameter of 1 inch and an overall height of 120 inches was used for the purpose of carrying out a liquid-liquid extraction of phenol from water using isobutyl acetate as the solvent, the process specification being at most 50 ppm of phenol in the raffinate. In accordance with generally employed practice in the extraction field, the plate spacing was initially arranged essentially by "intuition" or judgment from the top to the bottom of the column so that the column employed contained 78 inches of plate section having 1 inch plate spacing and 18 inches of plate section having 2 inch plate spacing, the total plate section being 96 inches. The 2 inch plate spacing employed was disposed at the top of the column, this again being based on "intuition" or judgment.

The operating conditions were as follows:

Phenol concentration—5% aqueous
Temperature of phenol solution—40° C.
Rate of feed of phenol solution—250 ml/min.
Rate of feed of isobutyl acetate—34 ml/min.
Temperature of isobutyl acetate feed—ambient (approx. 25° C.)
Temperature of column—ambient (approx. 25° C.)

The operating results were as follows:

| Stroke × Speed (inches/min.) | Raffinate concentration of phenol, ppm |
| --- | --- |
| 90 | 2,000 |
| 124 | 200 |
| 140 | Column flooded |

The drop size was substantially smaller near the top of the column than near the bottom indicating that substantially better efficiency was achieved near the top of the column than near the bottom. However, the process specification of at most about 50 ppm of phenol in the raffinate (water) was not achieved. This example illustrates the usual prior art procedures and normally in accordance with those procedures the next step would be to increase the plate spacing at the top of the column by "intuition" or judgment one or more times until the required process specification is achieved, if possible, without flooding the column.

Example 2

The column employed in Example 1 was employed once again for a liquid-liquid extraction of phenol from water except that the plate spacing distribution was calculated by use of equation (4) in accordance with this invention and only a total of 72 inches of plate stack was employed. Moreover, since the interfacial tension was not at that time known and the flow rates in different sections of the column differed, although not greatly, an approximation of plate spacing variation was calculated with equation (4) using the most important variable, that is the density difference, as the basis for making the calculation. The density difference measured at the top of the column was 1.0060 minus 0.950 or 0.056 and as measured at the bottom of the column it was 1.000 minus 0.882 or 0.118. Substituting only these figures in the equation and considering the others negligible in order to make a quick appoximation, the plate spacing ratio from the top to the bottom of the column was calculated as follows:

$$(0.118/0.056)^{5/3} = 3.46$$

Since it was known, however, that flow rates and interfacial tension would have an effect, the result calculated was rounded off to 4.0 and a plate spacing variation of 4 to 1 from the top to the bottom of the column was employed using only 72 inches of total plate stack. Starting at the top of the stack there was employed 1 foot of plates spaced 4 inches apart followed by 1 foot of plates spaced 3 inches apart followed by 1 foot of plates spaced 2 inches apart followed by 3 feet of plates spaced 1 inch apart, the distribution of plate spacing having been estimated based on estimated density differences in different section of the column.

The column was then set into operation employing the following conditions for this run:

Phenol concentration—8% aqueous(actual feed specification)
Temperature of phenol solution—40° C.
Rate of feed of phenol solution—250 ml/min.
Rate of feed of isobutyl acetate—34 ml/min.
Temperature of isobutyl acetate feed—ambient(approx. 25° C.)
Temperature of column—ambient(approx. 25° C.)

The operating results were as follows:

| Stroke × Speed (inches/min.) | Raffinate concentration of phenol, ppm |
| --- | --- |
| 180 | 50 |
| 222 | Column flooded |

The following observations were noted during the run. A substantially higher intensity of agitation was achieved with the plate stack employed. This accounts for the greater overall extraction of phenol from the water and it also resulted in achieving the raffinate specification of 50 ppm with only 6 feet of plate stack. In addition drop size was nearly uniform throughout, being slightly smaller near the top of the column.

This example clearly exemplifies the process and apparatus of this invention and the inherent advantages thereof as compared with generally used procedures as exemplified by Example 1.

Example 3

The procedure of Example 2 is repeated except that a more vigorous calculation for the plate spacing is made after measurement were made as follows:

| Relative values | Top of Column | Bottom of Column |
| --- | --- | --- |
| $(U_D + 0.67\, U_C)$ | 218.6 | 187.4 |
| Density difference | 0.056 | 0.118 |
| Interfacial tension | 7.3 | 9.8 |

Based on the measurements set forth, an even more precise optimization of plate spacing ratio using equation (4) is:

$$\frac{\left(\frac{218.6}{187.4}\right)^{2.5}}{\left(\frac{0.056}{0.118}\right)^{5/3}\left(\frac{7.3}{9.8}\right)^{1.5}} = \frac{1.47}{(0.2887)(0.6429)} = 7.9$$

Thus a more precise optimization of plate spacing variation is about 8 to 1. Moreover, in a column utilizing such a plate spacing variation, raffinate containing less than 50 ppm phenol is obtained.

While liquid-liquid separation involving an aqueous phenol solution and an isobutyl acetate solvent have specifically been used to illustrate the inventive process and apparatus in this case, it is to be understood that the process and apparatus of this invention can be employed to separate any of a wide variety of liquid mixtures utilizing any of a wide variety of suitable solvents. Thus, it is to be understood that this invention is not to be construed as applying only to the separation of phenol from water with isobutyl acetate or other convenient solvents.

The process of this invention presents numerous advantages. For example, it can be accomplished by the apparatus in such a manner as to achieve optimum conditions and yields in liquid-liquid separations with a wide variety of liquid mixtures. In addition, the invention minimizes the volume of a reciprocating plate extraction column required to carry out any particular liquid-liquid extraction.

Moreover, an extraction column for carrying out the process of this invention can be designed to meet the precise requirements of the particular liquid phases to be processed. Furthermore, this invention permits the construction of extraction columns which can vary widely in size, the particular relative plate configurations utilized being readily determinable by use of the equation given herein rather than by the trial and error methods previously utilized.

Numerous other advantages of this invention will be readily apparent to those skilled in the art. Accordingly it is to be understood that this invention is not to be limited to the particular embodiments disclosed herein except as defined in the appended claims.

What is claimed is:

1. In a process for liquid extraction using counterflowing liquid phases in a reciprocating plate extraction column, the improvement comprising spacing in at least a portion of the column a plurality of plates relative to one another according to the equation:

$$l \alpha \frac{(U_D + 0.67\ U_C)^{2.5}}{(\Delta\rho)^{5/3} \sigma^{1.5}}$$

wherein l is the relative plate spacing in different portions of the extraction column, $U_D$ is the superficial velocity of the dispersed phase at flooding, $U_C$ is the superficial velocity of the continuous phase at flooding, $\Delta\rho$ is the density difference and $\sigma$ is the interfacial tension between the counterflowing phases.

2. A process according to claim 1 comprising spacing, in series, a plurality of perforated plates.

3. A process according to claim 1 comprising spacing, in series, at least two perforated plates and at least one baffle plate.

4. A process according to claim 1 comprising spacing, in series, a disc, at least two perforated plates and at least one baffle plate.

* * * * *